(12) United States Patent
Micouin et al.

(10) Patent No.: US 6,191,205 B1
(45) Date of Patent: Feb. 20, 2001

(54) SILICA-BASE RUBBER COMPOSITION INTENDED FOR THE MANUFACTURE OF HIGHWAY TIRES IMPROVED RESISTANCE TO ROLLING

(75) Inventors: Jean-Marie Micouin, Chatel-Guyon; Yvonick Chevallier, Fontaines Saint-Martin, both of (FR)

(73) Assignee: Compagnie Generale des Establissements Michelin-Michelin & Cie, Cedex (FR)

( * ) Notice: Under 35 U.S.C. 154(b), the term of this patent shall be extended for 0 days.

(21) Appl. No.: 09/085,097

(22) Filed: May 26, 1998

(30) Foreign Application Priority Data

May 26, 1997 (FR) .................................................. 97/06370

(51) Int. Cl.[7] ....................................................... C08K 3/00
(52) U.S. Cl. ............................ 524/492; 524/493; 524/494
(58) Field of Search ................................... 524/492, 493, 524/494

(56) References Cited

U.S. PATENT DOCUMENTS

| | | |
|---|---|---|
| 5,227,425 | 7/1993 | Rauline ................................. 524/493 |
| 5,403,570 | 4/1995 | Chevallier et al. .................. 423/339 |

FOREIGN PATENT DOCUMENTS

| | | |
|---|---|---|
| WO9509127 | 4/1995 | (WO) . |
| 9509127 | * 4/1995 | (WO) . |

* cited by examiner

Primary Examiner—Edward J. Cain
(74) Attorney, Agent, or Firm—BakerBotts, L.L.P.

(57) ABSTRACT

The present invention relates to a rubber composition intended for the manufacture of road tires of improved resistance to rolling having a base of precipitated silica with a relatively high specific surface and special porosity properties.

27 Claims, No Drawings

SILICA-BASE RUBBER COMPOSITION INTENDED FOR THE MANUFACTURE OF HIGHWAY TIRES IMPROVED RESISTANCE TO ROLLING

BACKGROUND OF THE INVENTION

The present invention relates to new rubber compositions having a base of precipitated silica intended for the manufacture of road tires of improved resistance to rolling.

Since savings of fuel and the need for protecting the environment have become a priority, it is desirable to produce polymers having good mechanical properties and as low a hysteresis as possible in order to be able to use them in the form of rubber compositions which can be employed for the manufacture of various semi-finished products entering into the creation of tire bodies such as, for instance, underlayers, calendering layers, or sidewalls or treads, and to obtain road tires (cycles, motorcycles, passenger-car tires, heavy-vehicle tires) having improved properties which in particular are of reduced resistance to rolling.

In order to achieve this object, numerous solutions have been proposed consisting, in particular, of modifying, inter alia, the nature of the diene polymers and copolymers towards the end of polymerization by means of coupling or starring or functionalizing agents. All of these solutions have been concentrated essentially on the use of modified polymers with carbon black as reinforcing filler in order to obtain a good interaction between the modified polymer and the carbon black. It is known, in general, that in order to obtain the optimal reinforcement properties conferred by a filler, the latter should be present in the elastomeric matrix in a final form which is both as finely divided as possible and distributed as uniformly as possible. Now, such conditions can be realized only to the extent that, on the one hand, the filler is of very good ability of being incorporated in the matrix upon the mixing with the elastomer and of disintegrating or deagglomerating itself, and of being dispersed uniformly in the elastomer. The use of reinforcing white fillers and particularly of silica has proven inappropriate by reason of the low level of certain properties of such compositions and therefore of certain properties of the tires using these compositions.

Furthermore, for reasons of reciprocal affinity, the silica properties have a harmful tendency, in the elastomeric matrix, of agglomerating with each other. These silica/silica interactions have the harmful result of limiting the reinforcement properties to a level which is substantially below that which would be theoretically possible to obtain if all the silica/elastomer interactions capable of being created during the mixing operation were actually obtained.

Furthermore, the use of silica raises difficulties of processing due to the silica/silica interactions which tend in raw state (before curing) to increase the consistency of the rubber compositions, and in any event to make the processing more difficult than the processing of the carbon black.

The interest in silica reinforced compositions has been recently brought up again with the publication of European Patent Application EP-A-0 501 227 which discloses a sulfur-vulcanizable rubber composition obtained by thermomechanical working of a conjugated diene copolymer and an aromatic vinyl compound prepared by solution polymerization with 30 parts to 150 parts by weight for 100 parts by weight of elastomer, of a special precipitated silica. The use of such a silica has, to be sure, reduced the difficulties in processing mixtures containing it, by way of majority or not, as reinforcing filler, but the processing of such rubber compositions nevertheless remains more difficult than the processing of carbon black.

SUMMARY OF THE INVENTION

The object of the present invention is still further to reduce the resistance to rolling of road tires without substantially impairing the other properties.

It has been discovered, surprisingly, that the above problem can be solved by the use as reinforcing filler in diene rubber compositions of a precipitated silica having a relatively high specific surface and special properties of porosity.

The present invention has as its object a sulfur-vulcanizable rubber composition intended for the manufacture of road tires having a base of at least one diene polymer, characterized by the fact that it contains as reinforcing filler a precipitated silica having:

a BET specific surface of between 185 and 250 m$^2$/g, a CTAB specific surface of between 180 and 240 m$^2$/g, a pore distribution such that the pore volume V2 formed by pores, the diameters of which are between 175 and 275 Å, represent less than 50% of the pore volume V1 formed by the pores of diameters less than or equal to 400 Å, a pore volume ($V_{d1}$) formed by pores of a diameter less than 1 μm, more than 1.65 cm$^3$/g;

a fineness index (F.I.) of between 70 and 100 Å;

a ratio of fines ($\tau_f$), after ultrasonic deagglomeration, of at least 50%.

The silica has a relatively high specific surface. Its BET specific surface is between 185 and 250 m$^2$/g and preferably between 195 and 225 m$^2$/g, in particular between 200 and 220 m$^2$/g; its CTAB specific surface is between 180 and 240 m$^2$/g, and preferably between 185 and 220 m$^2$/g, in particular between 190 and 205 m$^2$/g.

In general, it has a BET specific surface ratio to CTAB specific surface varying between 1.0 and 1.2, that is to say, a low microporosity.

One of the characteristics of the precipitated silica resides in the distribution of the pore volume and, in particular, in the distribution of the pore volume which is generated by the pores of diameters of less than or equal to 400 Å. The silica has a pore distribution such that the pore volume constituted by pores whose diameter is between 175 and 275 Å represents less than 50%, and in particular at most 48%, and in particular between 25 and 45%, of the pore volume formed by pores of diameters less than or equal to 400 Å. In accordance with a preferred variant, the pore distribution is such that the $V_2/V_1$ ratio is between 0.25 and 0.45.

The silica has a pore volume ($V_{d1}$) formed by pores of a diameter less than 1 μm, more than 1.65 cm$^3$/g; this pore volume is preferably at least 1.70 cm$^3$/g, and in particular between 1.70 and 1.80 cm$^3$/g.

The silica, preferably, has a pore volume (V3) formed by pores the diameter of which is between 100 and 300 Å, which is at least 0.82 cm$^3$/g, in particular at least 0.85 cm$^3$/g; it is customarily at least 0.86 cm$^3$/g.

The silica has in general a total pore volume (TPV) of more than 3.0 cm$^3$/g, for instance between 3.1 and 3.4 cm$^3$/g and its fineness index (F.I.) is between 70 and 100 Å, and preferably between 80 and 100 Å, for instance between 82 and 98 Å.

The silica used in the composition of the invention thus has special characteristics of porosity which confer upon it an ability to dispersion (dispersibility) which is very satisfactory, that is to say it is a highly dispersible silica. Thus, it has a ratio of fines ($\tau_f$) or rate of particles of a size of less than 0.3 µm, after deagglomeration by ultrasonics, of at least 50%, and preferably at least 55%, which rate can, for instance be at least 60%.

In general, its ultrasonic deagglomeration factor ($F_D$) is more than 5.5 ml, in particular greater than 9 ml or even 13 ml, and it may have a median diameter ($\phi_{50}$) after ultrasonic deagglomeration of less than 8.5 µm, and in particular between 5 and 7 µm.

The silica used in the composition of the invention customarily has a pH of between 6.0 and 7.5 and in particular of between 6.3 and 6.9.

Its tapped filling density (DRT) is in general more than 0.26, and particularly 0.28; it is, for instance at least equal to 0.30.

The silica has an oil absorption (DOP) varying generally between 230 and 330 ml/100 g, and preferably between 240 and 300 ml/100 g.

It may be present in the form of powder, granules or, advantageously, in the form of substantially spherical balls.

The silica powders preferably have an average size of at least 15 µm; it is, for instance, between 15 and 60 µm (in particular, between 20 and 45 µm) or between 30 and 150 µm (in particular, between 45 and 120 µm).

The substantially spherical balls preferably have an average size of at least 80 µm and, more preferably, the average size of the balls is at least 100 µm, for instance at least 150 µm; it is generally, at the most, 300 µm. This average size is determined in accordance with NF X Standard 11507 (December 1970) by dry screening and determination of the diameter corresponding to a cumulative reject of 50%.

The CTAB-specific surface is determined in accordance with NFT Standard 45007 of November 1987. The BET-specific surface is determined by the BRUNAUER, EMMET, TELLER method described in "The Journal of the American Chemical Society, Vol. 80, page 309 (1938)," corresponding to NFT Standard 45007 of November 1987. The oil absorption DOP is determined in accordance with NFT Standard 30-022 (March 1953) using dioctylphthalate.

The pore volumes given are mercury porosimetric measurements; the preparation of each sample is effected as follows: each sample is previously dried for 2 hours in the oven at 200° C. and then placed in a test receptacle within 5 minutes following its emergence from the oven and degasified under vacuum, for instance, by means of a rotary drawer pump; the pore diameters being calculated by the WASHBURN ratio with a theta contact angle equal to 140° and a gamma surface tension equal to 484 dynes/cm (MICROMETRICS porosimeter 9300).

The fineness index (F.I.) represents the median radius of the intra-aggregate pores, that is to say the radius of the pores to which there corresponds the pore surface $S_O/2$ measured by mercury porosimetry ($S_O$ is the surface provided by all the pores the diameter of which is greater than or equal to 100 Å).

The dispersibility of the silicas is quantified by means of the measurement of the fines ratio ($\tau_f$), that is to say the proportion (by weight) of particles of a size less than 0.3 µm, after deagglomeration with ultrasonics, carried out in accordance with the dispersibility test described below.

In this test, the ability for dispersion of the silica is measured by a granulometric measurement (by sedimentation) carried out on a silica suspension which has been previously deagglomerated by ultrasonification. The deagglomeration (or dispersion) under ultrasonics is carried out by means of a VIBRACELL BIOBLOCK (600 W) sonifier equipped with a probe of a diameter of 19 mm. The granulometric measurement is carried out by means of a SEDIGRAPH granulometer (sedimentation in the gravity field+X-ray beam scanning).

4 grams of silica are weighed into a pill box (of a volume of 75 ml) and it is made up to 50 grams by the addition of permuted water; there is thus produced an 8% aqueous suspension of silica which is homogenized for 2 minutes by magnetic agitation. The deagglomeration (dispersion) by ultrasonics is then carried out as follows: The probe being immersed over a length of 4 cm, the outlet power is adjusted so as to obtain a deflection of the power needle indicating 20%. The deagglomeration is carried out for 210 seconds.

The granulometric measurement is then effected by means of a SEDIGRAPH granulometer. For this, the vertical scanning rate of the cell by the X-ray beam is adjusted to 918, which corresponds to an analyzed maximum size of 85 µm. Permuted water is circulated in said cell, whereupon the electric zero and the mechanical zero of the paper recorder (this adjustment being effected with the "100%" potentiometer of the recorder at maximum sensitivity) is adjusted. The pen of the paper recorder is placed at the point representing the starting size of 85 µm. The deagglomerated silica suspension is then circulated, possibly cooled previously, in the SEDIGRAPH granulometric cell (granulometric analysis carried out at 30° C.) and the analysis then starts. The analysis stops automatically as soon as the size of 0.3 µm is reached (about 45 minutes). The ratio of fines ($\tau_f$) is then calculated, that is to say, the proportion (by weight) of particles of a size of less than 0.3 µm.

This ratio of fines ($\tau_f$) or rate of particles of a size of less than 0.3 µm is higher the higher the dispersibility of the silica.

In certain cases, the ability for dispersion (and the deagglomeration) of the silicas can also be quantified by means of a specific deagglomeration test.

The deagglomeration test is carried out in accordance with the following protocol:

The cohesion of the agglomerates is determined by a granulometric measurement (by laser diffraction), carried out on a silica suspension which has been previously deagglomerated by ultrasonification; the ability of the deagglomeration of the silica (breaking up of the objects from 0.1 to a few tens of microns) is then measured. The deagglomeration under ultrasonics is effected by means of a VIBRACELL BIOBLOCK (600 W) sonifier equipped with a 19 mm diameter probe. The granulometric measurement is carried out by laser diffraction on a SYMPATEC granulometer.

2 grams of silica are weighed out into a pill box (height: 6 cm and diameter: 4 cm) and made up to 50 grams by addition of permuted water; there is thus produced a 4% aqueous solution of silica which is homogenized for 2 minutes by magnetic agitation. The deagglomeration is then effected under ultrasonics as follows: The probe being immersed over a length of 4 cm, the outlet power is adjusted in such a manner as to obtain a deflection of the power dial needle indicating 20%). The deagglomeration is effected for 420 seconds. The granulometric measurement is then carried out after having introduced a known volume (expressed in ml) of the homogenized suspension in the cell of the granulometer.

The value of the median diameter $\phi_{50}$ which is obtained is lower the greater the ability the silica shows for high deagglomeration. The ratio (10×volume of suspension introduced (in ml)/optical density of the suspension detected by the granulometer (this optical density is on the order of 20)

is also determined. This ratio is indicative of the rate of particles of a size less than 0.1 μm which are not detected by the granulometer. This ratio which is known as the ultrasonic deagglomeration factor ($F_D$) is higher the greater the ability for high deagglomeration presented by the silica.

The silica used in the composition in accordance with the invention is obtained by a method of preparation of precipitated silica of the type comprising the reaction of a silicate with an acidifying agent whereby there is obtained a suspension of precipitated silica, then the separation and the drying of this suspension, in which:

the precipitation is carried out in the following manner:
  (i) an initial reaction vessel bottoms or sediment is formed comprising a least a part of the total amount of silicate engaged in the reaction and at least one electrolyte, the concentration in silicate (expressed in $SiO_2$), in said initial reaction vessel bottoms being between 50 and 60 g/l,
  (ii) the acidifying agent is addedd to the said reaction vessel bottoms until obtaining a pH of the reaction medium of between 7 and 8.5,
  (iii) acidifying agent is added to the reaction medium and, if necessary, at the same time the remaining amount of the silicate.

the separation comprises a filtration and a washing by means of a filter equipped with a compacting means, a suspension having a rate of dry matter of less than 17% by weight is dried by spraying.

A certain relatively slight concentration of silicate, expressed as $SiO_2$ in the initial reaction vessel bottoms, combined with the use of a filter equipped with a compacting means, preferably at low compacting pressure, and with a suitable rate of dry matter in the suspension to be dried constituted important conditions in order to confer their good properties on the silicas on the composition of the invention.

The choice of the acidifying agent of the silicate is effected in well-known manner.

It may be recalled that as acidifying agent there can generally be used a strong inorganic acid such as sulfuric acid, nitric acid or hydrochloric acid, or an organic acid such as acetic acid, formic acid or carbonic acid.

The acidifying agent can be diluted or concentrated; its normality can be expressed between 0.4 and 8 N, for instance between 0.6 and 1.5 N.

In particular, in the event that the acidifying agent is sulfuric acid, its concentration can be between 40 and 180 g/l, for instance between 60 and 130 g/l.

One can furthermore use as silicate any current form of silicate such as metasilicates, disilicates and advantageously an alkaline metal silicate, in particular sodium or potassium silicate. The silicate may have a concentration expressed as silica of between 40 and 330 g/l, for instance between 65 and 300 g/l, in particular between 60 and 250 g/l.

In general, sulfuric acid can be employed as acidifying agent and sodium silicate as silicate.

In the event that sodium silicate is used, it has in general an $SiO_2/Na_2O$ weight ratio of between 2 and 4, for instance between 3.0 and 3.7.

With regard more particularly to the precipitation, it is carried out specifically in accordance with the following steps:

First of all, a reaction vessel bottoms is formed which comprise a silicate as well as an electrolyte (step (i)). The amount of silicate present in the initial reaction vessel bottoms represents advantageously only a portion of the total amount of silicate engaged in the reaction.

The silicate concentration in the initial vessel bottom is between 50 and 60 g of $SiO_2$ per liter. This concentration is preferably between 55 and 60 g/l.

The initial reaction vessel bottoms comprises an electrolyte. The term electrolyte is meant here in its normal acceptance, that is to say, it signifies any ionic or molecular substance which, when it is in solution, decomposes or dissociates to form ions or charged particles. As electrolyte, mention may be made of a salt of the group of alkaline and alkaline-earth salts, in particular the salt of the initial silicate metal and of the acidifying agent, for instance sodium chloride in the case of the reaction of a sodium silicate with hydrochloric acid or, preferably, sodium sulfate in the case of the reaction of a sodium silicate with sulfuric acid.

If the electrolyte used is sodium sulfate, its concentration in the initial dregs is preferably between 12 and 20 g/l and, in particular, between 15 and 20 g/l.

The second step consists in adding the acidifying agent in the reaction vessel bottoms of the composition described above (step (ii)).

This addition which results in a correlative drop in the pH of the reaction medium takes place until reaching a pH of between 7 and 8.5; and in particular between 7 and 8, for example between 7.5 and 8.

Once the desired pH value has been reached, the third step is then carried out (step iii)).

In the (preferred) case of an initial reaction vessel bottoms comprising only a part of the total amount of silicate engaged in the reaction, one proceeds, in step (iii) to a simultaneous addition of acidifying agent and the remaining amount of silicate.

This simultaneous addition is preferably carried out in such a manner that the value of the pH is constantly equal to (±0.2) that reached at the end of step (ii).

In general, in a following step, there is added to the reaction medium an additional amount of acidifying agent, preferably until obtaining a value of the pH of the reaction medium of between 4 and 6 and, in particular, of between 4.5 and 5.5.

It may be advantageous, after this addition of an additional amount of acidifying agent, to effect an aging of the reaction medium, which aging can for example last 1 to 30 minutes and, in particular, 2 to 15 minutes.

In the event of initial reaction vessel bottoms comprising the total amount of silicate engaged in the reaction, one proceeds, in step (iii), to an addition of acidifying agent, preferably until obtaining a pH value of the reaction medium of between 4 and 6 and, in particular, of between 4.5 and 5.5.

It may be advantageous, also after this step (iii), to effect an aging of the reaction medium, which aging can for instance last for 1 to 30 minutes, and in particular from 2 to 15 minutes.

The temperature of the reaction medium is generally between 68° C. and 98° C.

In accordance with a variant, the reaction is carried out at a constant temperature, preferably between 75° C. and 95° C.

In accordance with another variant, the temperature at the end of the reaction is higher than the temperature at the start of the reaction; thus, the temperature at the start of the reaction is maintained preferably between 68° C. and 80° C., whereupon the temperature is increased, preferably to a value of between 80° C. and 98° C., at which value it is maintained until the end of the reaction.

At the end of the steps which have just been described, a silica slurry is obtained which is then separated (liquid-solid separation).

The separation comprises a filtering and a washing by means of a filter equipped with a compacting means, the compacting pressure being preferably low.

This filter may be a band filter equipped with a roller which assures the compacting.

Nevertheless, the separation preferably comprises a filtration, a washing, and then a compacting, by means of a filter press; in general, the pressure at the end of filtration is between 3.5 and 6.0 bars, for instance between 3.8 and 4.5 bars; said compacting is very advantageously effected by the introduction of air at a pressure of below 4.5 bars, in particular between 3.8 and 4.3 bars for 20 to 40 seconds, for instance for about 30 seconds.

The suspension of silica precipitated which is thus recovered (filtration cake) is then dried by atomization.

The suspension must have, immediately before its drying by atomization, a percentage of dry matter less than 17% by weight. This percentage of dry matter is preferably between 14.5 and 16.5% by weight.

It is to be noted that, after the filtration, in a subsequent step of the process, one can add to the filtration cake dry matter, for instance silica in powdered form.

The drying can be effected by means of any suitable type of atomizer, in particular a turbine, nozzle, liquid-pressure or dual-fluid atomizer.

It is to be noted that the filtration cake is not always under conditions which permit atomization, in particular due to its high viscosity. In known manner, the cake is then subjected to a disintegration operation. This operation can be carried out by passing the cake into a crusher of colloidal or ball type. The disintegration is generally effected in the presence of an aluminum compound, in particular sodium aluminate and, preferably, in the presence of an acidifying agent such as described previously (in this latter case, the aluminum compound and the acidifying agent are advantageously added simultaneously). The disintegration operation in particular makes it possible to lower the viscosity of the suspension which is to be dried subsequently.

The drying is effected by means of a nozzle atomizer. The precipitated silica capable of then being obtained is advantageously in the form of substantially spherical balls, preferably of an average size of at least 80 $\mu$m, for instance at least 100 $\mu$m.

At the end of the drying, a crushing stage can be carried out on the recovered product. The precipitated silica which is then capable of being obtained is generally in the form of a powder, preferably of an average size of at least 15 $\mu$m, in particular between 15 and 60 $\mu$m, for instance between 20 and 45 $\mu$m.

The products crushed to the desired particle size can be separated from the possible products not in accordance with the invention, for instance by means of vibratory screens of appropriate mesh sizes, and the products not in accordance with the invention are recovered and sent back for crushing.

The drying can thus be effected by means of a turbine atomizer. The precipitated silica which can then be obtained may be present in the form of a powder, preferably of average size.

By diene polymers capable of being used in the compositions of the invention, there is understood any homopolymer obtained by polymerization of a conjugated diene monomer having from 4 to 12 carbon atoms, any copolymer obtained by polymerization of one or more dienes conjugated with each other or with one or more aromatic vinyl compounds having from 8 to 20 carbon atoms. By way of conjugated dienes there are suitable, in particular, butadiene-1,3,2-methyl-1,3-butadiene, 2,3-di ($C_1$ to $C_5$ alkyl)-1,3-butadiene such as for instance 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, etc.

By way of aromatic vinyl compounds there are suitable in particular styrene, ortho-, meta- and paramethylstyrene, the commercial "vinyl-toluene" mixture, para-tertiobutylstyrene, the methoxystyrenes, the chlorostyrenes, vinyl mesitylene, divinyl benzene, vinyl naphthalene, etc.

The copolymers can contain between 99% and 20% of diene units by weight and 1% to 80% by weight of aromatic vinyl units. The polymers may have any microstructure which is a function of the polymerization conditions used, in particular the presence or absence of a modifying agent and/or randomizing agent and amounts of modifying and/or randomizing agent used. The polymers may be blocks, statisticals, sequenced, microsequenced polymers, etc., and be prepared by dispersion or in solution.

Preferably the polybutadienes and in particular those having a content of 1,2 units of between 4% and 80% and those having more than 90% of cis-1,4 bonds, polyisoprenes, copolymers of butadiene-styrene and, in particular those having a styrene content of between 5% and 50% by weight and more particularly between 20% and 40% by weight, a content of 1,2 bonds of the butadiene portion of between 4% and 65%, a content of trans-1,4 bonds of between 30% and 80%, those having a total content of aromatic compound between 5% and 50% and a glass transition temperature (Tg) of between 0° C. and –80° C. and particularly those having a styrene content of between 25% and 30% by weight, a content of vinyl bonds of the butadiene portion of between 55% and 65%, a portion of trans-1,4 bonds of between 20% and 25% and a glass transition temperature of –20° C. and –30° C.

In the event of butadiene-styrene-isoprene copolymers there are suitable those having a styrene content of between 5% and 50% and more particularly between 10% and 40%, an isoprene content of between 15% and 60% by weight and, more particularly between 20% and 50% by weight, a butadiene content of between 5% and 50% and more particularly between 20% and 40% by weight, a content of 1,2 units of the butadiene portion of between 4% and 85%, a content of trans-1,4 units of the butadiene portion of between 6% and 80%, a content of 1,2 plus 3,4 units of the isoprene portion of between 5% and 70% and a content of trans-1,4 units of the isoprene portion of between 10% and 50%.

Of course, the diene polymer can be coupled and/or starred or else functionalized with a coupling agent and/or starring or functionalizing agent.

The compositions in accordance with the invention furthermore contain one or more diene polymers and silica, all or part of the other components and additives customarily used in the rubber mixes such as plasticizers, pigments, antioxidants, sulfur, vulcanization accelerators, extension oils, silica coupling agent(s), and/or one or more silica covering agent(s) such as alkoxysilanes, polyols, amines, etc.

In a manner unforeseeable to the person skilled in the art, it has been discovered that the use as reinforcing filler of silica having the characteristics defined above having a relatively high specific surface, that is to say, higher than the silica used in the examples of European Patent Application EP-A-0.501.227 and special porosity properties as well as a special method of operation consisting of subjecting said silica in a first stage to thermo-mechanical working with the diene elastomer, and then in a second stage subjecting the mixture obtained at the end of the first stage with at least one coupling agent to two-step thermo-mechanical working, confers upon the rubber compositions having a base of at least one synthetic diene polymer processing properties comparable to those of a silica of less fineness, which makes these compositions particularly useful for the production of semifinished products, in particular treads, underlayers, sidewall rubbers, calendering rubbers, which can be used as components of road tires having reduced resistance to rolling.

Thus, the present invention also has as its object semi-finished components which can be used in the manufacture of road tires, in particular treads, as well as road tires having an improved resistance to rolling, obtained by use of a rubber composition in accordance with the invention.

DESCRIPTION OF PREFERRED EMBODIMENTS

The invention also relates to a method of improving the hysteretic properties of sulfur-vulcanizable diene rubber compositions intended for the manufacture of road tires of improved resistance to rolling comprising silica as reinforcing filler, characterized by the fact that it consists in reinforcing said compositions with a precipitated silica having the following properties:

a BET specific surface of between 185 and 250 $m^2/g$,
a CTAB specific surface of between 180 and 240 $m^2/g$,
a pore distribution such that the pore volume V2 formed by the pores the diameter of which is between 175 and 275 Å represents less than 50% of the pore volume V1 formed by the pores of the diameters less than or equal to 400 Å,
a pore volume ($V_{d1}$), formed by the pores of a diameter less than 1 μm, greater than 1.65 $cm^3/g$,
a fineness index (F.I.) of between 70 and 100 Å,
a fines ratio ($\tau_f$) after deagglomeration by ultrasonics, of at least 50%, and in carrying out a thermo-mechanical working in several stages, the first stage consisting in effecting, by thermo-mechanical working, the mixing of the elastomer and of the silica, the second stage consisting of effecting several steps of mixing by thermo-mechanical working of the mixture obtained from the first stage with at least one coupling agent.

In accordance with a preferred embodiment, the number of further steps is 2 and the maximum drop temperature of the mixture is between 140° C. and 180° C., and more preferably 160° C. This thermo-mechanical work is carried out, as known per se, in accordance with the method described in European Patent Application EP-A-0 501 227, incorporated in the present application.

As coupling agents there are suitable all known agents and in particular the polysulfur organosilanes, preferably those marketed by Degussa under the names S169 and X50S.

The maximum beneficial effect is obtained when the silica having the special characteristics defined above constitutes all of the reinforcing filler. A beneficial effect is also obtained when the silica is used as majority or even when it is used blended with precipitated silicas of the prior art or with other white fillers.

The beneficial effect is obtained whatever the physical state in which the silica is, that is to say whether it is in the form of powder, microbeads, granules, pearls, etc.

The rubber composition of the invention is particularly well suited for the manufacture of treads of road tires intended, in particular, to equip passenger vehicles, heavy vehicles, vans, motorcycles and bicycles.

The invention is illustrated, not by way of limitation, by the following example which does not constitute a limitation of the scope of the invention.

The properties of the compositions are evaluated as follows:

Mooney viscosity: ML (1+4) at 100° C., measured in accordance with ASTM Standard D-1646.
Shore A hardness: Measurements carried out in accordance with DIN Standard 53505.
Moduli of elongation at 300% (ME 300), 100% (ME 100): Measurements carried out in accordance with ISO Standard 37. Scott breakage indexes: Measured at 23° C. Rupture force (RF) in MPa Elongation upon rupture (ER) in %. Hysteresis losses (HL): Measured by rebound at 23° C. and at 60° C. in accordance with ISO standard R17667, expressed in %. Resistance to rolling (RR): Measured on flywheel in accordance with ISO method 87-67. Average wear life (AWL): The wear life is determined by measurement of the loss of material corresponding to a reduction in height of the tread of 0.18 mm and then 0.35 mm/1000 km traveled.

The result set forth in the table is half the total of the 2 wear-resistance values measured. The reference value is 100, a value >100 indicating an improvement in the resistance to wear.

EXAMPLE

The purpose of this example is to compare two compositions of diene rubber which are identical with the exception of the silica used which, in the case of Test 1, is a silica of relatively high specific surface, having special properties of porosity subjected to a thermo-mechanical working in 3 steps and, in the case of Test 2 which is the control test, is a silica in accordance with the prior art.

The characteristics of the components are the following:
SBR solution: copolymer of butadiene-styrene, prepared in solution according to the process described in French Patent No. 2295 972, having a styrene content of 26%, a content of vinyl bonds of 60%, a content of trans-1,4 bonds of 22% and of cis-1,4 bonds of 18%, a Tg of −25° C. and subjected to starring with diethylene glycol in accordance with the process described in French Patent 2 053 786.
Polybutadiene (PB) is a polybutadiene having 93% cis-1,4 bonds obtained by the process described in French Patent No. 1 436 607.
Antioxidant: N-(1,3-dimethylbutyl-N"-phenyl-p- phenylenediamine.
Paraffin: Mixture of macrocrystalline and microcrystalline waxes.
Sulfenamide: n-cyclohexyl-2-benzothiazyl sulfenamide.
Coupling agent: Mixture in a ratio of 1:1 of carbon black N 330 and polysulfur organosilane marketed by Degussa under reference X 50S.
Silica of Test 2 in accordance with the prior art: BET 152 $m^2/g$; CTAB: 150 $m^2/g$; D50, 4.5 μm; $F_D$ 8 ml; marketed by Rhone Poulenc under the commerical name Z1165.
Silica of Test 1: BET 216 $m^2/g$: CTAB 192 $m^2/g$; DOP 295 ml/100 g.
Aromatic extension oil.

The silica of Test 1 is obtained by the process described below:

Into a stainless steel reactor provided with a propeller agitation system and a double-jacket heating there are introduced:

275 liters of aqueous sodium silicate (65° C.) having a weight ratio of $SiO_2/Na_2O$ equal to 3.45 and a density of 20° C. equal to 1.230. 825 liters of an aqueous solution (20° C.) containing 18.2 kg of $Na_2O_4$.

The concentration in silicate expressed in $SiO_2$ in the initial reaction vessel bottoms is then 58 g/l. The mixture is then brought to a temperature of 74° C. while maintaining it under agitation. There is then introduced, at a rate of 7.6 l/min, dilute sulfuric acid of a density at 20° C. equal to 1.050 until obtaining in the reaction mixture a pH value (measured at its temperature) equal to 7.7. The temperature of the reaction is 74° C. for the first 25 minutes; the temperature is then brought from 74 to 94° C. in about 10 minutes, and thereupon maintained at 94° C. until the end of the reaction.

There are then introduced (that is to say when the pH of the reaction mixture has reached a value of 7.7), jointly into the reaction mixture, aqueous sodium silicate of the type described above at a rate 2.1 l/min, and sulfuric acid, also of the type described above, at a regulated rate of flow such that the pH of the reaction mixture during the period of introduction is constantly 7.7±0.1. After 40 minutes of simultaneous addition, the introduction of the sodium silicate is stopped and the introduction of the dilute acid is continued for about 10 minutes so as to bring the pH of the reaction to a value equal to that of 5.2. After this introduction of acid, the reaction slurry obtained is maintained for 5 minutes under agitation.

The total duration of the reaction is 98 minutes.

There is thus obtained a slurry or suspension of precipitated silica which is then filtered and washed by means of a filter press with vertical plates, said plates being equipped with deformable membrane which makes it possible to compress the filtration cake by the introduction of compressed air; the slurry of precipitated silica is first of all filtered, the pressure at the end of the filtration being 5.6 bars; the cake formed is then washed with water, whereupon it is compacted by the introduction of air at a pressure of 4 bars for 30 seconds.

The cake obtained is then fluidized by mechanical and chemical action (simultaneous addition of sulfuric acid and of an amount of sodium aluminate corresponds to a weight ratio of $Al/SiO_2$ of 0.28%). After this disintegration operation, the resultant slurry, of a pH equal to 6.2 and a fire loss equal to 83.7% (and therefore a rate of dry matter of 16.3% by weight) is atomized by means of a nozzle atomizer.

The characteristics of the silica obtained in the form of substantially spherical balls are then as follows:

| | |
|---|---|
| BET specific surface | 216 m$^2$/g |
| CTAB specific surface | 192 m$^2$/g |
| Pore volume V1 represented by pores of d ≦ 400 Å | 0.97 cm$^3$/g |
| Pore volume V2 represented by pores 175 Å ≦ d ≦ 275 Å | 0.34 cm$^3$/g |
| Ratio V2/V1 | 0.35 |
| Pore volume ($V_{d1}$) formed by pores of d < 1 μm | 1.73 cm$^3$/g |
| Fineness index (F.I.) | 87 Å |
| Pore volume V3 represented by pores 100 Å ≦ d ≦ 300Å | 0.86 cm$^3$/g |
| Total pore volume (TPV) | 3.15 cm$^3$/g |
| DRT | 0.30 |
| DOP oil absorption | 295 ml/100 g |
| pH | 6.6 |
| Average particle size | 190 μm |
| $\varnothing_{50}$ (μm) | 5.2 |
| $F_D$ (ml) | 14.4 |

The silica subjected to the dispersibility test as defined above in the description has a ratio of fines ($\tau_f$), that is to say a proportion of particles of a size less than 0.3 μm after deagglomeration with ultrasonics, of 57%; and when it is subjected to the deagglomeration test by ultrasonics as defined previously in the description has median diameter ($\varnothing_{50}$) of 5.2 μm and an ultrasonic deagglomeration factor ($F_D$) of 14.4 ml.

The composition of test 1 is obtained by processing, in a first stage in an internal mixer for an average speed of the blades of 45 rpm until obtaining a maximum drop temperature of about 160°, diene elastomers and silica of relatively high specific surface and then in a second stage the mixture obtained at the outlet of this first stage is subjected in the presence of the coupling agent to a thermo-mechanical working in two stages which last 4 and 5 minutes respectively until reaching a drop temperature of 160° C. A finishing step is then carried out at 65° C. on an external mixer in the presence of the vulcanization system.

The composition of Test 2 is obtained by a thermo-mechanical working of the diene elastomers, the silica and the coupling agent in two stages which last 4 and 5 minutes respectively until reaching a drop temperature of 160° C., as described in European Patent Application EP-A-0501227.

In the following formulations, all parts are expressed by weight:

| Composition | Test 1 | Test 2 |
|---|---|---|
| SBR/PBR | 75/25 | 75/25 |
| Silica Z1165 | | 80 |
| Silica | 80 | |
| Aromatic oil | 30.5 | 30.5 |
| Coupling agent | 12.8 | 12.8 |
| Stearic acid | 1.0 | 1.0 |
| Anti-ozone wax | 1.5 | 1.5 |
| Zinc oxide | 2.5 | 2.5 |
| Antioxidant | 2.0 | 2.0 |
| Sulfur | 1.4 | 1.4 |
| Sulfenamide | 1.7 | 1.7 |
| Diphenyl guanidine | 1.5 | 1.5 |

The vulcanization is carried out at 150° C. for 40 minutes.

The properties and performances of these two compositions are compared with each other, both in unvulcanized state and in vulcanized state, with radial carcass tires of a size of 175/70-14 MXT the tread of which has several sectors, half of them having compositions used in Test 1 and the other half compositions used in Test 2.

The results are set forth in Table I.

TABLE I

| Composition | Test 1 | Test 2 |
|---|---|---|
| Properties in unvulcanized state | | |
| Mooney | 84 | 84 |
| Properties in vulcanized state | | |
| Shore A hardness | 62.7 | 62.9 |
| ME 100 | 1.56 | 1.53 |
| ME 300 | 1.70 | 1.92 |

TABLE I-continued

| Composition | Test 1 | Test 2 |
|---|---|---|
| ME 300/ME 100 | 1.09 | 1.25 |
| Scott breakage indices at: | | |
| 23° C. RF | 22.4 | 22.7 |
| 23° C. ER% | 660 | 610 |
| HL at 60° C.* | 30.8 | 27.8 |
| RR in kg/ton | 9.2 | 9.5 |
| DVM | 100 | 100 |

It is noted that composition 1 of the invention comprising silica of relatively high specific surface and a certain property of porosity and placed in use in 2 steps has a good dispersion of the silica in the elastomer and exhibits a good use of the composition, that is to say a use comparable to that obtained with a precipitated silica of less fineness, which makes it suitable for the production of semifinished products. This composition has a filler-elastomer interaction index which is substantially equivalent to that of the composition of Test 2.

It is noted moreover that it is particularly suitable to enter into the constitution in particular of a tread of road tires, since it leads to a road tire having a reduced resistance to rolling and this without this improvement taking place to the detriment of the other properties. This is entirely unexpected for the person skilled in the art who with a finer reinforcing filler expects to obtain on the one hand properties at the raw state, on the other hand rolling resistance [degraded], as one might have thought in connection with this latter performance in view of the increase in hysteresis lost of the composition 1 as compared with that of composition 2.

We claim:

1. A sulfur-vulcanizable rubber composition intended for the manufacture of road tires which have a reduced resistance to rolling, having a base of at least one diene polymer, characterized by the fact that it contains as reinforcing filler a highly dispersible silica obtained by precipitation in the following manner:
   (i) an initial reaction vessel bottoms is formed comprising at least a part of the total amount of silicate engaged in the reaction and at least one electrolyte, the concentration in silicate (expressed in $SiO_2$) in said initial reaction vessel bottoms between 50 and 60 g/l,
   (ii) the acidifying agent is added to the said reaction vessel bottoms until obtaining a pH of the reaction medium of between 7 and 8.5,
   (iii) acidifying agent is added to the reaction medium and, possibly, at the same time the remaining amount of the silicate.
   the separation comprises a filtration and a washing by means of a filter equipped with a compacting means,
   a suspension having a rate of dry matter of less than 17% by weight is dried by atomization,
   and by the fact that said silica is subjected in a first step to a thermo-mechanical working with the diene elastomer to constitute a mixture which is then subjected with at least one coupling agent in a second stage to two steps of thermo-mechanical working.

2. A composition according to claim 1, characterized by the fact that the said silicate concentration (expressed as $SiO_2$) in said reaction vessel bottoms is between 55 and 60 g/l.

3. A composition according to claim 1, characterized by the fact that the said electrolyte is sodium sulfate, its concentration in the initial reaction vessel bottoms being between 12 and 20 g/l.

4. A composition according to claim 1, characterized by the fact that after the simultaneous addition of acidifying agent and the remaining amount of silicate, an additional amount of the acidifying agent is added to the reaction mixture, until obtaining a pH of the reaction mixture of between 4 and 6.

5. A composition according to claim 1, characterized by the fact that a suspension having a content of dry matter of between 14.5 and 16.5% by weight is dried by atomization.

6. A composition according to claim 1, characterized by the fact that the separation comprises a filtration, a washing, and then a compacting by means of a filter press.

7. A composition according to claim 6, characterized by the fact that the said compacting is effected by introduction of air at a pressure of less than 4.5 bars for 20 to 40 seconds, for example for about 30 seconds.

8. A composition according to claim 7, characterized by the fact that the said pressure is between 3.8 and 4.3 bars.

9. A sulfur-vulcanizable rubber composition intended for the manufacture of road tires, having a base of at least one diene polymer, characterized by the fact that as reinforcing filler it contains a silica having:
   a BET specific surface of between 185 and 250 $m^2/g$,
   a CTAB specific surface of between 180 and 240 $m^2/g$,
   a pore distribution such that the pore volume V2 formed by the pores the diameter of which is between 175 and 275 Å represents less than 50% of the pre volume V1 formed by pores of a diameter less than or equal to 400 Å,
   a pore volume ($V_{d1}$) formed by pores of a diameter less than 1 µm, greater than 1.65 $cm^3/g$,
   a fineness index (F.I.) of between 70 and 100 Å,
   a fines ratio ($\tau_f$) after deagglomeration by ultrasonics of at least 50%.

10. A composition according to claim 9, characterized by the fact that the silica has a porous distribution such that the ratio V2/V1 is at most 0.48.

11. A composition according to claim 9, characterized by the fact that silica has an median diameter ($\phi_{50}$) after deagglomeration by ultrasonics of less than 8.5 µm.

12. A composition according to claim 9, characterized by the fact that the silica has an ultrasonic deagglomeration factor ($F_D$) more than 5.5 ml.

13. A composition according to claim 9, characterized by the fact that the silica has a pore volume (V3) formed by pores of a diameter of between 100 and 300 Å of at least 0.82 $cm^3/g$.

14. A composition according to claim 9, characterized by the fact that the silica has a total pore volume (TPV) of greater than 3.0 $cm^3/g$.

15. A composition according to claim 1, characterized by the fact that the diene polymer is a butadiene-styrene copolymer or a butadiene-styrene-isoprene copolymer.

16. A composition according to claim 15, characterized by the fact that the butadiene-styrene copolymer is a copolymer prepared in solution having a styrene content of between 25 and 30% by weight, a content of vinyl bonds of the butadiene portion of between 55% and 65%, a content of trans-1,4 bonds of between 20% and 25% and a glass transition temperature of between −20° C. and −80° C.

17. A composition according to claim 15, characterized by the fact that it furthermore contains polybutadiene having more than 90% cis-1,4 bonds.

18. A method of improving the properties of resistance to rolling of sulfur-vulcanizable diene rubber compositions and intended for the manufacture of road tires comprising silica as reinforcing filler, characterized by the fact that it consists of reinforcing compositions with a precipitated silica having:

a BET specific surface of between 185 and 250 m²/g, a CTAB specific surface of between 180 and 240 m²/g, a pore distribution such that the volume V2 formed by pores the diameter of which is between 175 and 275 Å represents less than 50% of the pore volume V1 formed by the pores of diameter less than or equal to 400 Å, a pore volume ($V_{d1}$) formed by pores of a diameter less than 1 μm, greater than 1.65 cm³/g, a fineness index (F.I.) of between 70 and 100 Å, a fines ratio ($\tau_f$) after deagglomeration by ultrasonics, of at least 50%, subjecting said silica in a first stage to thermo-mechanical working with the diene elastomer and that in a second stage subjecting the mixture obtained at the outlet of the first stage with at least one coupling agent to two thermo-mechanical working steps.

19. A road tire having a reduced resistance to rolling comprising a diene rubber composition which is sulfur-vulcanizable, comprising silica as reinforcing filler, characterized by the fact that the composition comprises a highly dispersible precipitated silica having:

a BET specific surface of between 185 and 250 m²/g, a CTAB specific surface of between 180 and 240 m²/g, a pore distribution such that the pore volume V2 formed by pores the diameter of which is between 175 and 275 Årepresents less that 50% of the pore volume V1 formed by the pores of diameter less than or equal to 400 Å, a pore volume ($V_{d1}$) formed by pores of a diameter less than 1 μm, greater than 1.65 cm³/g, a fineness index (F.I.) of between 70 and 100 Å, a fines ratio ($\tau_f$) after deagglomeration by ultrasonics, of at least 50%.

20. A tire according to claim 19, characterized by the fact that the silica has a pore volume (V3) formed of pores of a diameter of between 100 and 300 Å of at least 0.82 cm³/g.

21. A tire according to claim 19, characterized by the fact that the silica is subjected in a first stage to the thermo-mechanical working with the diene elastomer and by the fact that, in a second stage, the mixture obtained at the end of the first stage is subjected with at least one coupling agent to two steps of thermo-mechanical working.

22. A tread for road tires having a base of a composition of sulfur-vulcanizable diene rubber comprising silica as reinforcing filler, characterized by the fact that the composition comprises a highly dispersible precipitated silica having:

a BET specific surface of between 185 and 250 m²/g, a CTAB specific surface of between 180 and 240 m²/g, a pore distribution such that the pore volume V2 formed by pores the diameter of which is between 175 and 275 Å represents less than 50% of the pore volume V1 formed by pores of a diameter less than or equal to 400 Å, a pore volume ($V_{d1}$) formed by pores of a diameter less than 1 μm, greater than 1.65 cm³/g, a fineness index (F.I.) of between 70 and 100 Å, a fines ration ($\tau_f$), after deagglomeration by ultrasonics, of at least 50%.

23. The composition according to claim 9, characterized by the fact that the silica has a porous distribution such that the ratio V2/V1 is between 0.25 to 0.45, inclusive.

24. The composition according to claim 9, characterized by the fact that silica has an median diameter ($\emptyset_{50}$) after deagglomeration by ultrasonics of between 5 and 7 μm.

25. The composition according to claim 9, characterized by the fact that the silica has an ultrasonic deagglomeration factor ($F_D$) more than 9 ml.

26. The composition according to claim 9, characterized by the fact that the silica has a total pore volume (TPV) between 3.1 and 3.4 cm³/g.

27. The tire according to claim 19, characterized by the fact that the silica has a pore volume (V3) formed of pores of a diameter of between 100 and 300 Å of at least 0.85 cm³/g.

* * * * *

UNITED STATES PATENT AND TRADEMARK OFFICE
CERTIFICATE OF CORRECTION

PATENT NO. : 6,191,205 B1
DATED : February 20, 2001
INVENTOR(S) : Micouin et al.

It is certified that error appears in the above-identified patent and that said Letters Patent is hereby corrected as shown below:

Title page, Item [54], and Column 1, line 3,
Title, "IMPROVED" should read -- OF IMPROVED --
Item [56], References Cited, FOREIGN PATENT DOCUMENTS,
"9509127 * 4/1995 (WO)" should be deleted
Item [73], Assignee, "Generale" should read -- Générale --; and "Establissements" should read -- Etablissements --

Column 2,
Line 67, "dispersion" should read -- disperse --

Column 5,
Line 18, "addedd" should read -- added --

Column 10,
Line 38, "2995 972," should read -- 2 295 972, --
Line 47, "-N″-" should read -- -N′- --
Line 53, "330and" should read -- 330 and --
Line 57, "commerical" should read -- commercial --

Column 14,
Line 41, "an" should read -- a --

Column 15,
Line 7, "volume" should read -- pore volume --
Line 31, "Årepresents" should read -- Å represents --

UNITED STATES PATENT AND TRADEMARK OFFICE
CERTIFICATE OF CORRECTION

PATENT NO. : 6,191,205 B1
DATED : February 20, 2001
INVENTOR(S) : Micouin et al.

It is certified that error appears in the above-identified patent and that said Letters Patent is hereby corrected as shown below:

Column 16,
Line 29, "an" should read -- a --

Signed and Sealed this

Eighteenth Day of June, 2002

Attest:

JAMES E. ROGAN
Attesting Officer  Director of the United States Patent and Trademark Office